United States Patent [19]

Berson

[11] 4,202,114
[45] May 13, 1980

[54] SAILING TRAINING DEVICE

[76] Inventor: Steven Berson, 25 Marsh St., Newport, R.I. 02840

[21] Appl. No.: 903,534

[22] Filed: May 8, 1978

[51] Int. Cl.$^2$ .............................................. G09B 9/06
[52] U.S. Cl. ................................................ 35/11 A
[58] Field of Search ....................... 35/11 A, 12 F, 74

[56] References Cited

U.S. PATENT DOCUMENTS

| 2,470,143 | 5/1949 | Christie | 35/12 F |
| 3,529,366 | 9/1970 | Alwin | 35/74 |
| 3,570,140 | 3/1971 | Sprong | 35/11 A |

Primary Examiner—William H. Grieb
Attorney, Agent, or Firm—David S. Woronoff

[57] ABSTRACT

A training device for teaching individuals the proper positioning of a sailboat's boom relative to the boat in a given wind. The device has three planar members, a front (base) member indicating wind position and having sailing terms printed therein, a second planar member representing the boat and a third planar member representing the boom of a sailboat. Three axis members interconnect the planar members for proper relative rotation. The first axis member secures the free end of the boom to the base member. The second axis member fixes the second planar (boat) member for rotation about the base member. The third axis member fastens the front end of the third planar (boom) member to the second planar (boat) member and allows some relative rotation.

7 Claims, 2 Drawing Figures

SAILING TRAINING DEVICE

BACKGROUND OF THE INVENTION

A. Field of the Invention

The present invention relates to a training aid for teaching sailing to individuals.

B. Description of the Prior Art

The only known prior art are pictures in texts in which a plurality of illustrations depict what the present invention shows in one device.

SUMMARY

The present invention discloses a novel training aid for teaching certain basics of sailing to individuals. The training aid has three planar members. A first planar member (base) represents the wind and has various pertinent information printed thereon which can be read. A second planar member (boat) represents the position of a boat on the base, i.e. the position of the boat relative to the wind. A third planar (boom) member represents the boom of a sailboat. Three pin or axis members interconnect the planar members so that the relative position of the boat in the wind will cause the boom to be guided into the correct position for sailing. A first pin member interconnects the boom member to the base member. A second pin member interconnects the boat member to the base member so that the boat can rotate with respect to the base member. A third pin member interconnects the front of the boom member to the front end (forward portion) of the boat member. A first channel is formed in the boat member to allow for the free movement of the "free end" of the boom. This channel is formed in a circular shape of less than 360°. A second channel is formed in the boat member to function as a window or frame to enable the user to read what is printed on the base. A first channel is formed in the boom member to allow for passage of the first pin member.

DESCRIPTION OF THE DRAWING

Figure 2:
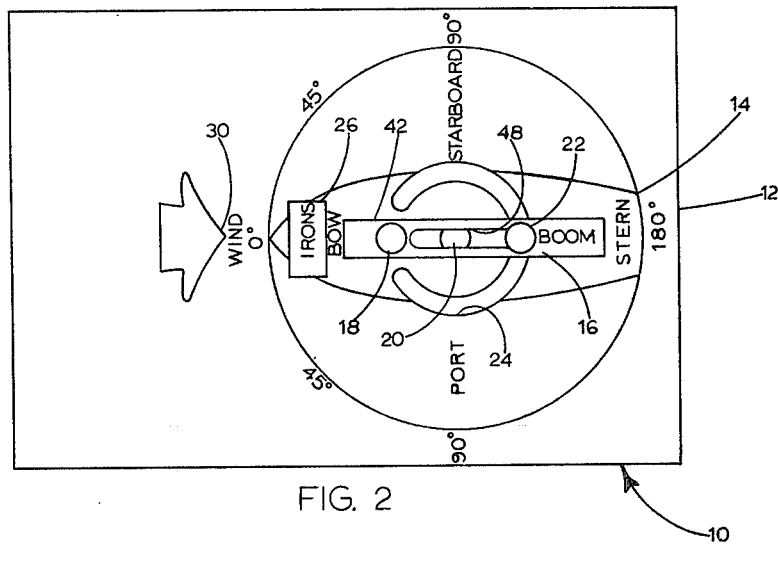
FIG. 2 shows an top view of the present invention.
Figure 1:
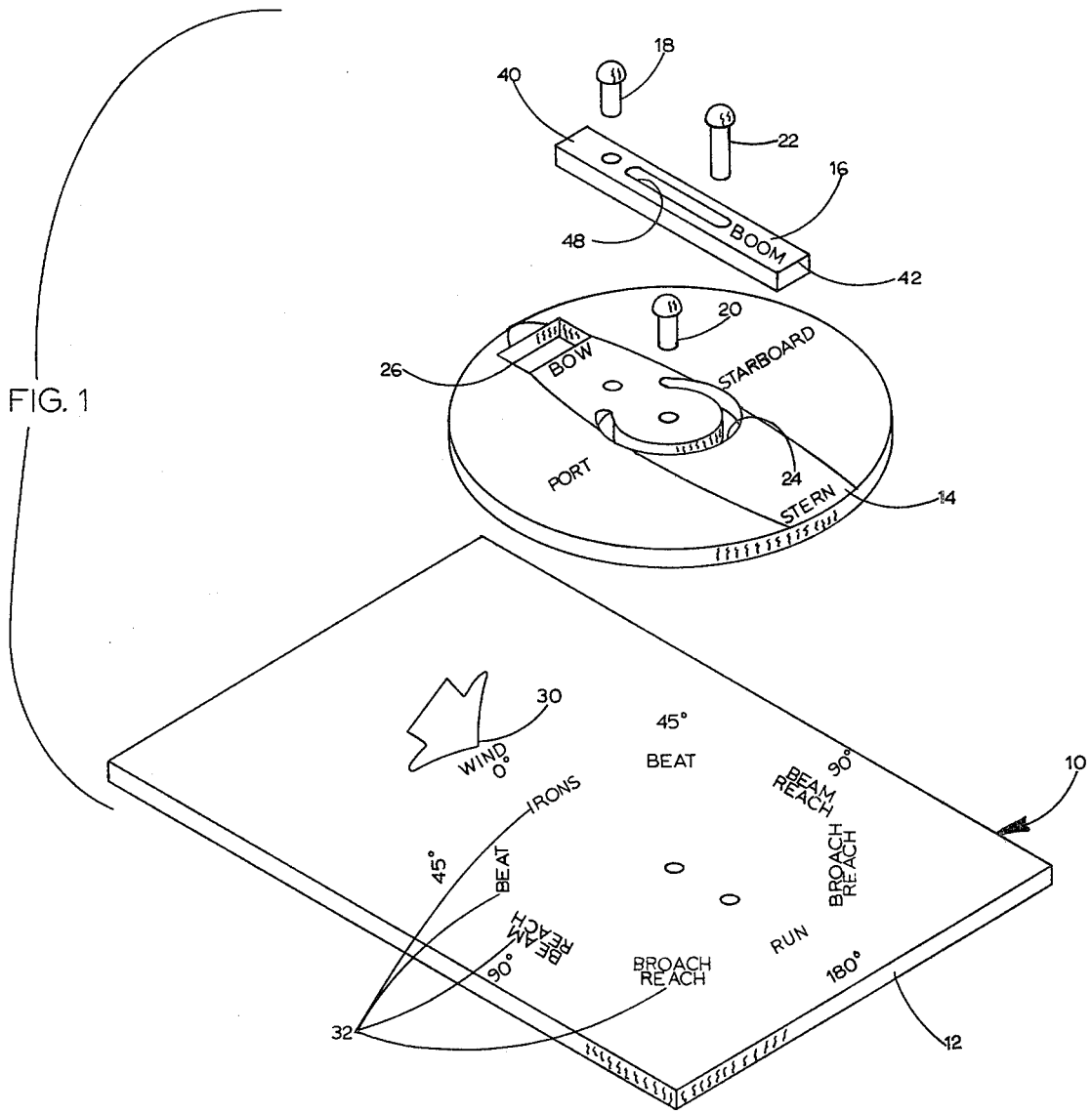
FIG. 1 shows a exploded perspective view of the present invention.

In FIG. 1 the numeral 10 shows a training device having first 12, second 14, and third 16 planar members. The first planar member 12 functions as a base member and has an arrow 30 to show wind direction and various sailing terms 32 such as "Irons", "Close Hauled", "Reach". "Broad Reach", "Run" etc. The second planar member 14 represents a sailboat and may be formed in that shape or have it printed therein and has a window or frame 26 formed therein which exposes the correct term as the boat 14 is rotated in the wind. Second planar member 14 may be either transparent or opaque. If transparent the frame 26 may be printed instead of cut through planar member 14. A third planar member 16 represents the boom and may be formed in that shape or have it printed therein. In common with most sailboat booms, the boom member 16 is fixed for rotation about its "front end" 40 to the front (if the boat is "cat" or "sloop" rigged, three other types fit the front end of the main sail boom elsewhere) portion of the boat member 14 by a first axis member 18. FIG. 1 shows the articulation of the various planar members clearly. A second axis member 20 permits the boat member 14 to rotate about the base member 12. This rotation allows the boat 14 to assume different positions with respect to the wind arrow 30 shown on the base member.

A nearly circular channel 24 member is formed in the boat member underneath the "free end" 42 of the boom to allow the boom 16 free movement. A third axis member 22 fastens the "free end" 42 of the boom 16 to the base member 12 and rides in channel 24 formed in the boat member 14. The channel 24 is formed through a nearly 360° arc which can be generated by halving the distance between the second and third axis members 20, 22 and drawing a nearly 360° arc on that raduis R. The second axis member 20 can be placed in that portion of the uncompleted circular channel 24. A first channel 48 is formed in the boom member 16 to allow pin 18 to pass therethrough and to provide a loss motion slot for the free end of the boom.

In operation when the boat 14 is positioned in particular position with respect to the wind arrow 30, the boom 16 will be forced into the correct sailing position and the frame 26 will show the correct name for the sailing condition. Clearly the training aid accomplishes its objects of being a simple, easy to use and understand teaching device. The training aid 10 shows the student a picture of correct boom and boat position in a given wind condition and correctly labels these positions.

Those skilled in the art will recognize that modification can be made to the present invention without departing from the scope of the present invention. For example, it is contemplated that a plastic or similar synthetic non-water soluble, non-water absorptive material would be utilized for planar members 12, 14, and 16. Similarly axis members 18, 20, 22 should preferable be formed of non-rusting materials i.e. materials without iron such as aluminum or brass. However, other materials can be used. The boom member 16 and the sailboat member 14 can be of nearly appropriate relative size for a sloop, catboat, or other design.

I claim:

1. In a teaching aid for teaching individuals to sail sailboats the combination comprising:

first, second, and third planar members;

said first planar member depicting the wind direction near the surface of the water;

said second planar member representing the bow of a sailboat;

said third planar member formed to represent the boom of a sailboat;

first, second, and third axis members;

said first axis member interconnecting said second and third planar members;

said second axis member interconnecting said first and second planar members for mutual rotation;

said first planar member interconnected to said third planar member by said third axis member.

2. The device claimed in claim 1 including further; a first channel formed in said second planar member to provide a path for said third axis member.

3. The device claimed in claim 1 including further; a window member formed in said second planar member; and arrow member formed on said first planar member, printed information formed on said first planar member to be shown in said window member when said second planar member is in a specific position relative to said first planar member.

4. The device claimed in claim 1 wherein said planar members are formed of a plastic material and said axis members are formed of an iron-free material.

5. The device claimed in claim 1 wherein said first, second, and third planar members are formed of a plastic material and said first, second and third axis members are formed of a iron-free material, an arrow member and printed information is formed on said first planar member; said second planar member has a window formed therein and a nearly circular channel member formed therein to provide a path for said third axis member; and said window uncovers specific portions of said printed information corresponding to the relative position of said first and second planar member.

6. The device claimed in claim 5 wherein said planar members are formed of opaque material and said second planar member has the shape of a sailboat printed therein and said third planar member has the shape of a sailboat boom printed therein wherein said shapes are in approximately correct size relationship.

7. The device claimed in claim 6 wherein said boom member has a channel formed therein for allowing said first pin member to pass therethrough.

* * * * *